(12) United States Patent
Wegmann et al.

(10) Patent No.: US 8,781,489 B2
(45) Date of Patent: Jul. 15, 2014

(54) COORDINATING RADIO RESOURCE PARTITIONING IN A RELAY ENHANCED TELECOMMUNICATION NETWORK

(75) Inventors: Bernhard Wegmann, Holzkirchen (DE); Simone Redana, Munich (DE); Bernhard Raaf, Neuried (DE)

(73) Assignee: Nokia Siemens Networks Oy, Espoo (FI)

( * ) Notice: Subject to any disclaimer, the term of this patent is extended or adjusted under 35 U.S.C. 154(b) by 36 days.

(21) Appl. No.: 13/577,089

(22) PCT Filed: Feb. 3, 2010

(86) PCT No.: PCT/EP2010/051311
§ 371 (c)(1),
(2), (4) Date: Dec. 18, 2012

(87) PCT Pub. No.: WO2011/095211
PCT Pub. Date: Aug. 11, 2011

(65) Prior Publication Data
US 2013/0115968 A1 May 9, 2013

(51) Int. Cl.
*H04W 72/04* (2009.01)
*H04W 16/10* (2009.01)
*H04W 84/04* (2009.01)
*H04B 7/26* (2006.01)

(52) U.S. Cl.
CPC ........ *H04W 72/0493* (2013.01); *H04W 84/047* (2013.01); *H04W 16/10* (2013.01); *H04W 72/0426* (2013.01); *H04B 7/2606* (2013.01)
USPC ....................................... 455/452.1; 370/315

(58) Field of Classification Search
CPC H04W 72/082; H04B 7/2608; H04L 27/2647
USPC ......... 455/452.1, 423; 370/315; 375/260, 211
See application file for complete search history.

(56) References Cited

U.S. PATENT DOCUMENTS

| 2007/0097867 A1 | 5/2007 | Kneckt et al. | 370/236 |
| 2010/0315989 A1* | 12/2010 | Reznik et al. | 370/315 |
| 2011/0292865 A1* | 12/2011 | Seo et al. | 370/315 |

OTHER PUBLICATIONS

R1-084102, 3GPP TSG RAN WG1 Meeting #55, Prague, Czech Republic, Nov. 10-14, 2008, "L2 Relay Interference Mitigation", Research in Motion, Limited, 6 pgs.
R2-092827, 3GPP TSG RAN WG2 Meeting #66, San Francisco, USA, May 4-8, 2009, "Information exchange over a wireless X2 interface between relay nodes", Sharp, 3 pgs.
3GPP TR 36.814 V1.3.0 (Jun. 2009), "$3^{rd}$ Generation Partnership Project; Technical Specification Group Radio Access network; Further Advancements for E-UTRA, Physical Layer Aspects (Release 9)", 46 pgs.

* cited by examiner

*Primary Examiner* — Phuoc H Doan
(74) *Attorney, Agent, or Firm* — Harrington & Smith

(57) ABSTRACT

A method includes acquiring an information from a second base station by a first base station, wherein the information is indicative for a relative timing displacement between (a) a first time pattern of a first radio resource partitioning scheme and (b) a second time pattern of a second radio resource partitioning scheme. The method further includes adapting the first time pattern of the first radio resource partitioning scheme, used by the first relay node, to the second time pattern of the second radio resource partitioning scheme, used by the second relay node, in such a manner that Time Transmission Intervals (TTIs) of the first time pattern which one used for uplink radio transmissions coincide with TTIs of the second time pattern which one used for uplink radio transmissions. A corresponding first base station is adapted for controlling and/or for carrying out the above described method.

22 Claims, 1 Drawing Sheet

COORDINATING RADIO RESOURCE PARTITIONING IN A RELAY ENHANCED TELECOMMUNICATION NETWORK

FIELD OF INVENTION

The present invention relates to the field of operating cellular telecommunication networks, which are enhanced by relay nodes. In particular, the present invention relates to a method for coordinating a first radio resource partitioning scheme being used by a first base station and by a first relay node being served by the first base station with a second radio resource partitioning scheme being used by a second base station and by a second relay node being served by the second base station. Further, the present invention relates to a first base station for coordinating its first radio resource partitioning scheme being used also by a first relay node being served by the first base station with a second radio resource partitioning scheme being used by a second base station and by a second relay node being served by the second base station.

ART BACKGROUND

A cost efficient solution for improving the performance and in particular the spatial coverage of Long Term Evolution (LTE) and LTE-Advanced (LTE-A) telecommunication networks is the utilization of relay nodes (RN), which allows installations without having terrestrial broadband access or the need to install micro wave links. In a relay enhanced telecommunication network there are basically three different types of radio connections:

(A) A first type of radio connection is the connection between a base station (BS) and a user equipment (UE). This type of connection is called a direct link.

(B) A second type of radio connection is the connection between a BS and a RN. This type of connection is called a backhaul link or a relay link.

(C) A third type of radio connection is the connection between a RN and a UE. This type of connection is called an access link.

One promising application of relaying uses the same frequency band for the relay link and for the access link. This approach is called in-band backhauling. In this approach, the RN is not able to transmit and receive simultaneously due to self-interference resulting from missing frequency duplex isolation. The available radio (transmission) resources need to be partitioned between the access links and the relay links in a Time Domain Multiplex (TDM) manner. Such a radio resource partitioning is described in detail in the 3rd Generation Partnership Project (3GPP) Technical Report "TR 36.814 v1.3.0 (2008-09), Further Advancements for E-UTRA, Physical Layer Aspects". Thereby, there is defined a time subframe consisting of several Time Transmission Intervals (TTIs) or time slots, where one subset of the TTIs/slots is used for relay links and the complementary subset of TTIs/slots is used for the access links. In this document this defined time subframe is referred to as a Resource Partitioning Window (RPW). In this document the corresponding resource split is referred to as radio resource partitioning.

It is mentioned that in this approach all the available radio resources can be used for the direct links. This means that the direct links share the radio resources with the relay links. Thereby, a user scheduler in the respective BS decides to schedule relay links or direct links on any particular frequency resource of an Orthogonal Frequency Division Multiplexing (OFDM) telecommunication system. Further, the direct links and the access links may use the same (time) resources, and additionally known Inter Carrier Interference Coordination (ICIC) measures may be employed.

In a relay enhanced telecommunication network a new type of interference may occur: This type of interference is the RN-to-RN interference between a transmitting first RN and a receiving second RN. Such a type of interference cannot be found in other types of heterogeneous networks which comprise for instance femto access points or Pico-BSs. Therefore, this type of interference and its impact has been not investigated yet, but solutions to mitigate it are now becoming necessary.

In downlink (DL), RN-to-RN interference occurs when a RN-to-UE communication interferes with a victim BS-to-RN communication. Thereby, the difference in the antenna gains, transmission powers, etc. between BS and RN makes the interference signal typically even more than 20 dB lower than the wanted signal. Therefore, the RN-to-RN interference in DL is typically not a big problem.

On the contrary in uplink (UL), RN-to-RN interference occurs when a RN-to-BS communication interferes with a victim UE-to-RN communication producing an interfering signal that could be even more than 20 dB higher than the wanted signal due to the difference in antenna gain, transmission powers, etc. between UE and RN. This is mostly because the RN has typically a higher transmit power than the UE and also has often an antenna with a higher gain. Furthermore, the antennas of RNs are typically installed at higher altitudes and will therefore more likely have a line of sight connection to the victims interfered RN antenna. Therefore, RN-to-RN interference is an issue in UL.

Typically a radio resource partitioning is decided at the BS and communicated DL to its connected RNs. Thereby, a proper radio resource partitioning can be done by the BS which avoids RN-to-RN interference between neighboring RNs that are controlled by the same BS. However, RNs in neighboring sectors belonging to different BS may suffer from the RN-to-RN interference because of the following reasons (i) and (ii):

(i) Neighboring RNs being controlled by different independent BSs typically use different radio resource partitioning schemes. This means that a different number of time slots or TTIs are used for access link and relay link. There may be contemporary UL transmission on the access link for one RN being assigned to a first BS and the UL backhauling of a neighboring RN being assigned to a second BS.

(ii) There is typically no need for inter-BS synchronization of a LTE cellular network when operating in Frequency Division Duplex (FDD) mode. Therefore the radio resource partitioning respectively radio resource time patterns for access link and relay link at neighboring BS are typically out of sync as well. As a consequence, a RN-to-RN interference may occur also if two neighboring BS use the same radio resource time pattern but the offset between the pulsing of the different BSs is as such that time slots respectively TTIs used at the first BS for radio communication via a relay link (backhauling) collide with the time slots respectively TTIs used for radio communication via an access link to the RN belonging to the second BS.

A straight-forward solution to remove an offset between different radio resource time patterns used in neighboring BSs would be a network-wide inter-BS synchronization by using GPS modules at each BS. Disadvantages of this solution are in addition to the additional costs for the GPS receivers at each BS the problem that (a) GPS signals may not be receivable at all sites (e.g. indoor BSs or underground BSs), (b) the necessity to mount yet another antenna and (c) the potential non-availability of GPS signals which are not under the control of the network operator but are controlled by another entity from another country.

There may be a need for improving the performance of a relay enhanced radio telecommunication network.

SUMMARY OF THE INVENTION

This need may be met by the subject matter according to the independent claims. Advantageous embodiments of the present invention are described by the dependent claims.

According to a first aspect of the invention there is provided a method for coordinating (i) a first radio resource partitioning scheme being used by a first base station and by a first relay node being served by the first base station with (ii) a second radio resource partitioning scheme being used by a second base station and by a second relay node being served by the second base station. The provided method comprises acquiring an information from the second base station by the first base station, wherein the information is indicative for a relative timing displacement between (a) a first time pattern of the first radio resource partitioning scheme and (b) a second time pattern of the second radio resource partitioning scheme. The provided method further comprises adapting the first time pattern of the first radio resource partitioning scheme, which is used by the first relay node, to the second time pattern of the second radio resource partitioning scheme, which is used by the second relay node, in such a manner that a radio interference between the first relay node and the second relay node is reduced at least partially.

The described radio resource partitioning coordinating method is based on the idea that the strengths of interference between the first relay node (RN) and the second RN can be avoided or can be reduced by coordinating the respective radio resource time patterns in an appropriate manner.

The relative timing displacement may be briefly called a (time) offset between the first time pattern of the first radio resource partitioning scheme and the second time pattern of the second radio resource partitioning scheme.

It is mentioned that the information being indicative for the relative timing displacement respectively for the offset between (a) the first time pattern of the first radio resource partitioning scheme and (b) the second time pattern of the second radio resource partitioning scheme may allow the first base station (BS) to determine the relative timing displacement respectively the offset. This may mean that it is not necessary that the information comprises the relative timing displacement. It is rather also possible that the second base station is not aware about the relative timing displacement. In this respect the information may be for instance a timing signal, which is transmitted by the second base station and which, upon reception by the first base station, allows the first base station to determine the relative timing displacement respectively the offset.

According to an embodiment of the invention the information comprises a value representing the relative timing displacement.

The described value may be for instance a number representing the relative timing displacement in any dimension such as e.g. milliseconds. Thereby the number may be an integer number or a rational number. An integer number may provide the advantage that the necessary signaling traffic can be reduced because generally less bits have to be signaled for communicating an integer number than for communicating a rational number. A rational number may provide the advantage that the time resolution for the relative timing displacement may be increased. Thus more detailed information can be acquired by the first base station in order to appropriately adapt the first time pattern with respect to the second time pattern.

The value may also be an alphanumerical character which, as agreed before between the second base station and the first base station, represents the relative timing displacement. Generally, for transmitting the information about the relative timing displacement any arbitrary coding can be used between the second and the first base station.

According to a further embodiment of the invention the information represents the adapted first time pattern. This may be realized for instance by transmitting a bitmap, which defines (a) which time slots or Time Transmission Intervals (TTIs) are used for radio transmissions between the first relay node and the first base station via a backhaul link or a relay link and (b) which TTIs are used for radio transmissions between a user equipment being served by the first relay node and the first relay node via an access link.

Generally speaking, the information may instruct the first base station how to adapt the first time pattern. This may provide the advantage that after having acquired the information the first base station can immediately start to carry out the respective adaptation or coordination. This may result that the described method can be carried out in a fast and effective manner.

According to a further embodiment of the invention the information represents the length of a time subframe comprising a certain number of time slots. Thereby, a first subset of the time slots is used for transmitting radio signals between the second relay node and the second base station and a complementary second subset of the time slots is used for transmitting radio signals between a user equipment being served by the second relay node and the second relay node.

The described time subframe, which is an important parameter of the (second) radio resource partitioning scheme, may also be called a Resource Partitioning Window (RPW). The described time subframe or RPW may have a length of for instance 8 time slots. A time slot may also be denominated a Time Transmission Interval (TTI).

Generally speaking, the first subset of time slots of the RPW may be used or may be reserved for radio transmissions via a relay link within a second cell being assigned to the second base station. Accordingly, the second subset of time slots, which with respect to the subframe is complementary to the first subset, may be used or may be reserved for radio transmissions via access link(s) within the second cell.

According to a further embodiment of the invention the relative timing displacement is defined in units of the time subframe. This may provide the advantage that information about the second time pattern can be provided to the first base station in an effective manner with respect to the required signaling load.

Units of the time frame may particularly denote a factor. Such a factor may be in particular a rational number indicating a certain fraction of the time frame respectively the RPW. This may mean that the relative timing displacement or the offset can be measured in units of the length of the resource partitioning window.

According to a further embodiment of the invention the information further represents a ratio between the number of time slots of the first subset and the number of time slots of the second subset. This may provide the advantage that valuable information about the second radio resource partitioning scheme, i.e. the relationship between the number of time slots being usable for radio transmissions via relay link(s) and the number of time slots being usable for radio transmissions via access link(s), can be effectively transferred from the second base station to the first base station without creating a large signaling (over)load within the radio telecommunication network.

Based on at least some of the above mentioned information contents the assignment of time slots can be coordinated between the first base station and the second base station in such a way that the RN-to-RN interference between the second RN and the first RN is avoided or at least reduced to a minimum. Knowing for instance the offset between the two time patterns of the respective radio resource partitioning schemes both (a) the offset of the second time pattern of the second base station and (b) the time slots which are used by the second base station to schedule uplink backhauling in particular for those relay nodes, which are located close to the sector border between the first base station and the second base station, can be adapted in such a manner that the mentioned RN-to-RN interference can be minimized. Specifically, the first BS can avoid to schedule uplink access in RN cells for its connected RNs close to sector border, i.e. the first BS can reassign its own time slots in order to eliminate or at least minimize the RN-to-RN interference.

According to a further embodiment of the invention the relative timing displacement is defined by a modulo operation of a total timing displacement and the time subframe. This may be in particular advantageous if the timing displacement is measured in units of the length of the time subframe respectively the RPW. For instance if a time pattern of time slots being assigned to access links repeats with a periodicity of 40 ms, then the timing displacement also needs to be specified at most up to 40 ms. A higher timing displacement of for instance 50 ms is then equivalent to the modulo operation of the timing displacement modulo 40 ms, i.e. 10 ms in this case. This helps to reduce the number of bits required for signaling, as not the entire sub-frame number needs to be communicated, only to the resolution of 40 ms.

It is mentioned that the timing displacement between the first time pattern and the second time pattern can be measured for instance by a network node such as for instance a relay node, a user equipment and/or a further base station, which network node receives timing signals both from the first base station and timing signals from the second base station. Specifically, the described network node may (a) measure its time difference both to the first base station and to the second base station, (b) evaluate or generate a time control command depending on the measured timing difference and (c) send the time control command to the first base station. Thereby, the mentioned time control command may be a single-bit or multi-bit command. Further, measuring the time difference may be based on downlink signals or on primary and/or secondary synchronization signals. Furthermore, in case the described network node is a relay node or a user equipment, it may signal or indicate, e.g. by cell identity or site identity, to which base station it is connected. The described procedure for determining the relative timing displacement may be improved by employing at least two time control information from at least two relay nodes, by processing, such as summing or averaging or weighted averaging, the received at least two time control information.

According to a further embodiment of the invention the information is acquired via an X2-interface between the second base station and the first base station. This may provide the advantage that the information about at least the timing displacement between the two time patterns can be provided in an effective manner to the first base station. Thereby, a signaling via any radio interface can be avoided.

According to a further embodiment of the invention the information is acquired via a further network node and/or an Operation and Maintenance Center (OMC). Generally speaking, the information about at least the timing displacement may be transferred on any arbitrary route from the second base station to the first base station. Similarly, the decision to modify the partitioning scheme can be done by the base station, however the decision unit can also be detached from the base station and be deployed in another network element for example a Radio Network Controller (RNC) or in a node of the Operations and Maintenance System, e.g. a Self Organizing Network (SON) controller.

According to a further embodiment of the invention the method further comprises (a) determining a strength of interference which is caused by transmitting a radio signal from one of the two relay nodes and by receiving the radio signal by the other of the two relay nodes, and (b) comparing the determined strength of interference with a predefined reference value. Thereby, the steps of acquiring and adapting are only carried out if the determined strength of interference is larger than the predefined reference value. This may provide the advantage that the coordination respectively the adaptation of the radio resource partitioning scheme is only accomplished if there is chance to significantly reduce RN-to-RN interference and, as a consequence, to increase the overall quality of radio transmissions within the relay enhanced telecommunication network.

According to a further embodiment of the invention the first base station and the second base station represent a Self Organizing Network. This may mean that the described method can be carried out in a de-centralized manner within a cellular radio telecommunication network comprising a plurality of base stations. Thereby, base stations, which are located relatively close to each other, i.e. at least one radio network element being assigned to one base station might possible interfere with another radio network element being assigned to the other base station, can automatically coordinate its resource partitioning such that RN-to-RN interferences are minimized.

According to a further embodiment of the invention during adapting the first time pattern of the first radio resource partitioning scheme the second radio resource partitioning scheme is maintained unchanged.

Generally speaking, in order to ensure stability of the whole relay enhanced telecommunication system it must be guaranteed that during the adaptation respectively the updating of one radio resource partitioning scheme the radio resource partitioning schemes of all neighboring cells are on a "hold" status.

Such a stable situation can be realized in a simple and effective manner if the radio resource partitioning is changed on a time scale which is long enough to guarantee that other Radio Resource Management (RRM) functions, for instance the user scheduler, adapt to the changes imposed by the respective base station. Therefore, this long time scale update of the radio resource partitioning makes the proposed algorithm stable even without any central coordination unit. In particular, it avoids or it at least reduces the chance that simultaneously two base stations, e.g. the first and the second base station, change their radio resource partitioning in an attempt to align their time patterns, but in the end they just swap their radio resource partitioning and in the end it is as incompatible as before.

According to a further embodiment of the invention the method further comprises transmitting a pre-warning signal from the first base station to the second base station, wherein the pre-warning signal indicates an upcoming adaptation of the first time pattern of the first radio resource partitioning scheme. This may provide the advantage that the first base station can trigger its surrounding base stations, in particular the second base station, to maintain their radio resource partitioning scheme at least for some time during which the adaptation of the first time pattern of the first radio resource partitioning scheme should have been completed. Furthermore the other base stations can anticipate the change of the partitioning scheme also for other functions e.g. Radio Resource Management (RRM) functions like scheduling. They are also aware that previously collected statistics e.g. on interference distribution on different timeslots, may change and should be reassessed.

According to a further embodiment of the invention adapting the first time pattern of the first radio resource partitioning scheme comprises a small change towards an optimal adapted first time pattern.

Generally speaking, by avoiding radical changes of the first time pattern, where basically the first base station changes the radio resource allocation by a larger number of for instance 6 time slots, and by performing only small changes towards an optimum radio resource partitioning setting, an instable situation can be avoided. The described small change may be for instance a shift of only one time slot or a radio resource reallocation for different types of radio links within only one or two time slots. In this case it does not matter if simultaneously with the first base station also the second base station changes its time pattern in a small manner, i.e. for instance by one time slot. In this case the two base stations will nevertheless approach their radio resource allocation towards an optimal adaptation of the two radio resource partitioning schemes.

It is mentioned that only in the end there is the risk that both base stations oscillate around the optimum setting in steps of one time slot respectively one TTI adjustment. It is mentioned that this can be avoided by reducing the speed of the adjustment once the expected adaptation only involves a single time slot/TTI.

Further, an oscillation at the end of an adaptation procedure can be avoided by updating the respective radio resource pattern with a probability of less than one. In this case the probability that simultaneously two (e.g. neighboring) base station adapt their radio resource partitioning is small and only one base station will accomplish the final approach step and a stable final state will be reached. Once that state is reached there is no reason for any base station to consider further adaptations of their radio resource partitioning schemes.

In this respect it is mentioned that once a basic synchronization is reached, a further refinement is only possibly by shifting the timing of at least one of the base stations by a fraction of a time slot/TTI. This is similar to achieving a timing alignment of Time Division Duplex (TDD) base stations and can therefore be obtained by similar mechanisms. The difference is only that here the time slots of the involved base station do not have to be synchronized in the end, because the offset can be used to compensate some de-synchronization. This allows reaching a coordinated operation (i.e. a quasi-synchronization) much faster. In this way the concept of the described radio resource partitioning coordinating method, which makes use of the timing displacement to get quickly a reasonable alignment, can be fruitfully combined with the described known alignment of TDD base stations in order to fine tune the radio resource partitioning alignment even further.

According to a further aspect of the invention there is provided a first base station for coordinating (i) its first radio resource partitioning scheme being used also by a first relay node being served by the first base station with (ii) a second radio resource partitioning scheme being used by a second base station and by a second relay node being served by the second base station. The provided first base station comprises a unit for acquiring of an information from the second base station, wherein the information is indicative for a relative timing displacement between (a) a first time pattern of the first radio resource partitioning scheme and (b) a second time pattern of the second radio resource partitioning scheme. The provided first base station further comprises a unit for adapting the first time pattern of the first radio resource partitioning scheme, which is used by the first relay node, to the second time pattern of the second radio resource partitioning scheme, which is used by the second relay node, in such a manner that a radio interference between the first relay node and the second relay node is reduced at least partially.

Also the described first base station is based on the idea that the strengths of interference between the first relay node (RN) and the second RN can be reduced at least partially by coordinating the respective radio resource time patterns in an appropriate manner.

According to a further aspect of the invention there is provided a computer program for coordinating (i) a first radio resource partitioning scheme being used by a first base station and by a first relay node being served by the first base station with (ii) a second radio resource partitioning scheme being used by a second base station and by a second relay node being served by the second base station. The computer program, when being executed by a data processor of in particular the first base station, is adapted for controlling or for carrying out the above described radio resource partitioning coordinating method.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

It is mentioned that the invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
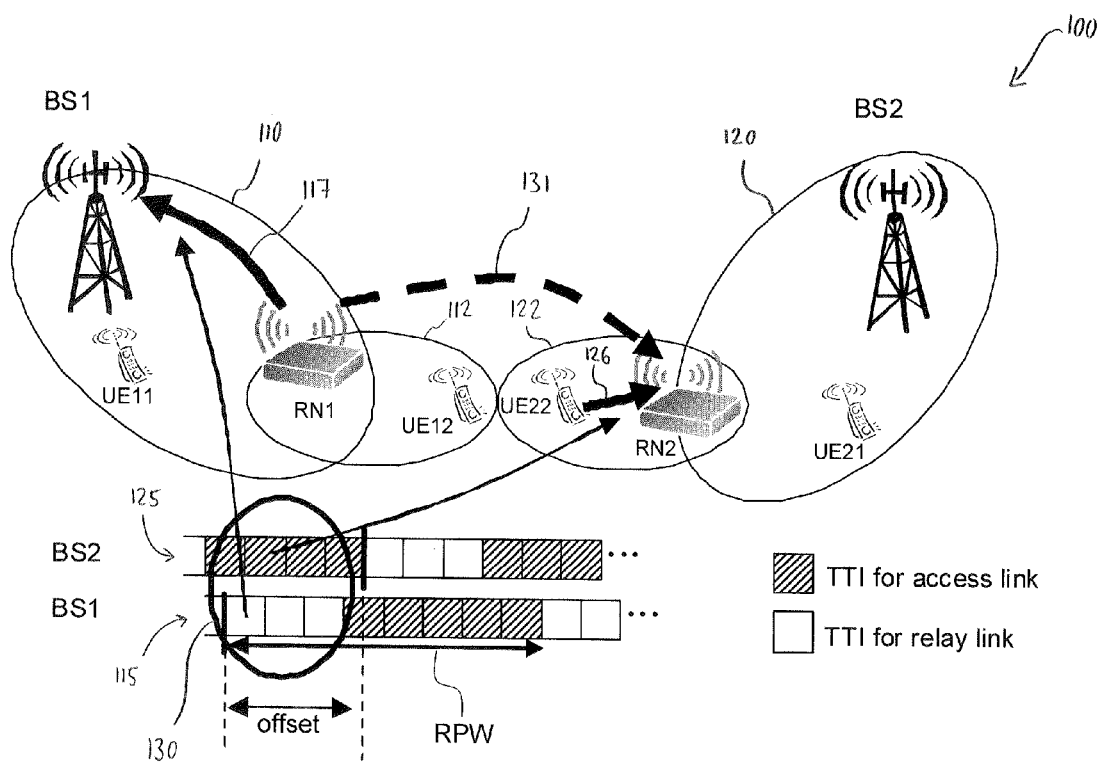
FIG. 1 shows a relay enhanced telecommunication network, wherein due to an inappropriate radio resource partitioning of two neighbouring base stations a strong RN-to-RN interference occurs.

The illustration in the drawing is schematically. It is noted that in different figures, similar or identical elements are provided with the same reference signs or with reference signs, which are different from the corresponding reference signs only within the first digit.

FIG. 1 shows a detail or a section of a relay enhanced cellular telecommunication network 100. The telecommunication network 100 comprises a first cell 110 being assigned to a first base station BS1 and a second cell 120 being assigned to a second base station BS2.

A first relay node RN1 is connected to the first base station BS1. The first relay node RN1 defines a first relay cell 112, which extends the spatial coverage of the first cell 110. A user equipment UE11 is directly connected to the first base station BS1 via a so called direct link. A user equipment UE12 is connected to the first relay node RN1 via a so called access link. The first relay node RN1 is connected to the first base station BS1 via a so called backhaul or relay link.

A second relay node RN2 is connected to the second base station BS2. The second relay node RN2 defines a second relay cell 122, which extends the spatial coverage of the second cell 120. A user equipment UE21 is directly connected to the second base station BS2 via a direct link. A user equipment UE22 is connected to the second relay node RN2 via an access link. The second relay node RN2 is connected to the second base station BS2 via a backhaul or relay link.

According to the embodiment described here the first relay node RN1 and the second relay node RN2 operate on the same radio frequency resource. This holds both for transmitting radio signals (uplink and downlink) and for receiving radio signals (uplink and downlink).

For radio communication within the first cell 110 and the first relay cell 112 the first base station BS1 prescribes a first resource partitioning scheme 115. In accordance with the 3rd Generation Partnership Project (3GPP), Technical Report "TR 36.814 v1.3.0 (2008-09), Further Advancements for E-UTRA, Physical Layer Aspects", each time frame is divided in several time slots (in the following also called Time Transmission Intervals (TTIs)), which are respectively reserved for a specific type of radio transmission.

Specifically, some TTIs are reserved for and usable for transmitting (and receiving) radio signals via direct links extending e.g. between the user equipment UE11 and the first base station BS1. In the drawing these TTIs are not illustrated explicitly. As was described already above, direct links can operate also in parallel with the access and relay links so these TTIs can comprise also the following two ones, and are of lesser importance for the present invention.

Some TTIs are reserved for and usable for transmitting (and receiving) radio signals via access links extending e.g. between the user equipment UE12 and the first relay node RN1. In the drawing TTIs being assigned to access links are illustrated as hatched boxes.

Last but not least some TTIs are reserved for and usable for transmitting (and receiving) radio signals via relay or backhaul links extending e.g. between the first relay node RN1 and the first base station BS1. In the drawing TTIs being assigned to relay or backhaul links are illustrated as white boxes. Typically a TTI can be assigned to only the latter or former purpose, i.e. either to access or relay links in order to avoid self interference.

In further accordance with the above mentioned Technical Report there is defined a time subframe consisting of a first subset of several TTIs being reserved for relay links and a complementary second subset of TTIs being reserved for access links. In this document this defined time subframe is referred to as a resource partitioning window RPW. The corresponding resource split is referred to as a radio resource partitioning scheme.

For radio communication within the second cell 120 and the second relay cell 122 the second base station BS2 prescribes a second resource partitioning scheme 125. Also the second resource partitioning scheme 125 defines a plurality of TTIs, which in accordance with the elucidation given above for the first resource partitioning scheme 115 are assigned either to direct links, access links or relay (backhaul) links.

As can be seen from FIG. 1 the resource partitioning window RPW used by the first base station BS1 comprises 8 TTIs. According to the embodiment described here three TTIs are assigned to the relay link extending between the first relay node RN1 and the first base station BS1. The remaining five TTIs are assigned to the access link extending for instance between the RN1 and the user equipment UE12. It is mentioned that of course also other radio resource partitioning schemes comprising different numbers of TTIs for the resource partitioning window and/or a different numbers of TTIs being assigned to the relay link and/or to the access link could be employed.

It is mentioned that according to the embodiment described here although the second resource partitioning scheme 125 comprises a resource partitioning window with 8 TTIs, wherein three of them are assigned to the relay link extending between the relay node RN2 and the base station BS2 and five of them are assigned to access link(s) within the relay cell 122. It is mentioned that for realizing the invention it is not necessary that both base stations BS1 and BS2 use strictly the same radio partitioning schemes.

As can be further seen from FIG. 1, there is currently a timing displacement between the two (radio) resource partitioning schemes 115 and 125. As a consequence, there is a time interval 130 during which in particular for uplink data transmissions a strong interference between the two relay nodes RN1 and RN2 might occur. Specifically, during the time interval 130 the first relay node RN1 might transmit radio signal to its serving base station BS1. This is illustrated in FIG. 1 with reference numeral 117. In the same time interval the second relay node RN2 might "listen" to the user equipment UE22, which transmits radio signals to the second relay node RN2. The radio transmission from the user equipment UE22 to the second relay node RN2 is indicated with reference numeral 126.

Typically, the radio signal transmitted by the first relay node RN1 is comparatively strong as compared to the radio signal transmitted by the user equipment UE22. As a consequence, the second relay node RN2, which serves the user equipment UE22, will also hear/receive unwanted radio signals from the first relay node RN1. This unwanted interference between the first relay node RN1 and the second relay node RN2 is indicted in FIG. 1 with the dashed arrow 131.

Figure 2A:
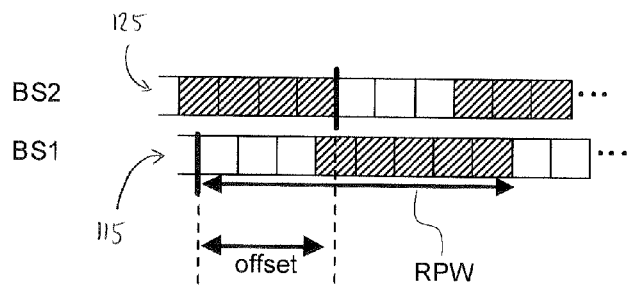
FIGS. 2a and 2b illustrate an adaptation of the radio resource partitioning scheme of a first base station in such a manner that RN-to-RN interference between the first base station and a second base station is minimized.
Figure 2B:
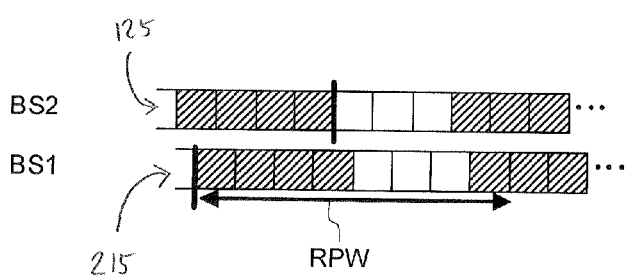

FIGS. 2a and 2b illustrate an adaptation of the radio resource partitioning scheme 215 of the first base station BS1 in such a manner that the RN-to-RN interference between the first base station BS1 and the second base station BS2 is minimized. FIG. 2a, which shows exactly the same radio partitioning as FIG. 1, illustrates the initial situation. FIG. 2b illustrates the adapted first resource partitioning scheme 215 being used by the first base station BS1 after the radio resource partitioning coordinating method described in this document has been completed.

As can be seen from FIG. 2b, the adaptation of the first resource partitioning scheme 115 to the adapted first resource partitioning scheme 215 comprises a time shift such that (a) TTIs of the adapted first resource partitioning scheme 215, which TTIs are used for (uplink) radio transmissions within the first cell 110 and/or the first relay cell 112, more or less coincide with (b) TTIs of the second resource partitioning scheme 215, which TTIs are also used for (uplink) radio transmissions within the second cell 120 and/or the first relay cell 122.

It has to be mentioned that FIGS. 2a and 2b exemplify the case where the TTIs, which are used for relay links, are allocated in a block wise fashion. The invention is however also applicable to the case were these TTIs are allocated in a distributed way. For instance TTIs No. 2 and No. 7 are allocated for radio transmissions over relay links. The advantage of such a distributed allocation is that the maximum time for a TTI in any direction is now shorter. The same also holds for the extra time delay which a radio signal will experience waiting for such an allowed TTI during which it can be sent. The following series show such an allocation in two adjacent cells of two adjacent base stations BS1 and BS2:

BS1: 0 1 R 3 4 5 6 R 8 9 0 1 R 3 4 5 6 R 8 9 0 1 R 3 4 5 6 R 8 9 0 1

BS2: 8 9 0 1 R 3 4 5 6 R 8 9 0 1 R 3 4 5 6 R 8 9 0 1 R 3 4 5 6 R 8 9

Each letter "R" indicates a TTI being used for radio transmission over relay or backhaul links within the cell being assigned by the respective base station BS1 or BS2. In the following these TTIs are simply referred to as relay TTIs. In this example the relay TTIs and the whole cell timing being assigned to the first base station BS1 is misaligned by 2 TTIs with respect to the second base station BS2. This misalignment of the relay TTIs ("R"-TTIs) can be solved by allocating TTIs 4 and 9 for relay links in the adapted resource partitioning scheme being assigned to the first base station BS1. The following series show the corresponding alignment:

BS1: 0 1 2 3 R 5 6 7 8 R 0 1 2 3 R 5 6 7 8 R 0 1 2 3 R 5 6 7 8 R 0 1

BS2: 8 9 0 1 R 3 4 5 6 R 8 9 0 1 R 3 4 5 6 R 8 9 0 1 R 3 4 5 6 R 8 9

It is pointed out that it may not be possible to change the allocation in the TTIs being assigned to the second base station BS2 because this would require that the TTIs 0 and 5 were used. However, these TTIs might be reserved for some specific signals that allow user equipments to synchronize to its serving base station by analyzing for instance a Primary Synchronization Signal (PSS) and/or a Secondary Synchronization Signal (SSS) being broadcasted by the respective base station. As a consequence these TTIs are not eligible to be configured for instance as Multi-Media Broadcast over a Single Frequency Network (MBSFN) TTIs. However, MBSFN TTIs are only needed for relaying at the relay, not necessarily at the serving donor base station, so actually this configuration could also be used by the donor base station, but the timing of the relay node would need to be shifted accordingly. This gives the following timing, now also indicating a row for a potential configuration of a relay cell, indicated by RN2 which is connected to the base station BS2:

BS1: 0 1 R 3 4 5 6 R 8 9 0 1 R 3 4 5 6 R 8 9 0 1 R 3 4 5 6 R 8 9

BS2: 8 9 R 1 2 3 4 R 6 7 8 9 R 1 2 3 4 R 6 7 8 9 R 1 2 3 4 R 6 7 8 9

RN2: 0 1 R 3 4 5 6 R 8 9 0 1 R 3 4 5 6 R 8 9 0 1 R 3 4 5 6 R 8 9

It is mentioned that in this example it is assumed that with respect to the timing of the first base station BS1 the TTIs "0" and "5" are reserved for transmitting PSS and/or SSS. Further, TTIs "4" are used for transmitting for instance paging signals. As a consequence, only the TTIs "1", "2", "3", "6", "7" and "8" remain free for being allocated for radio transmissions over relay links. However, by allocating the "R"-TTIs of both base stations within these TTIs in a coordinated manner, the RN-to-RN interference can be reduced to a minimum.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In these examples cases have been presented where the resource partitioning schemes for both relays RN1 and RN2 use the same number of TTIs for relay communication in the RPW. However the invention is also applicable to cases where this number is different. In this case some interference is unavoidable as not all TTIs can be paired in the two relays. Still the occurrence of non-matching combinations can be minimized by a proper reconfiguration according to the invention. In this case there may be even more than one optimal alignment of the two resource partitioning schemes.

LIST OF REFERENCE SIGNS 100 telecommunication network
110 first cell
112 (first) relay cell
115 first resource partitioning scheme
117 uplink radio transmission from RN1 to BS1
120 second cell
122 (second) relay cell
125 second resource partitioning scheme
126 uplink radio transmission from UE22 to RN2
130 time interval
131 interference between RN1 and RN2
215 adapted first resource partitioning scheme
BS1 first base station
RN1 first relay node
UE11 user equipment
UE12 user equipment
BS2 second base station
RN2 second relay node
UE21 user equipment
UE22 user equipment
RPW resource partitioning window

The invention claimed is:
1. A method, the method comprising
coordinating a first radio resource partitioning scheme being used by a first base station and by a first relay node being served by the first base station with a second radio resource partitioning scheme being used by a second base station and by a second relay node being served by the second base station, the coordinating comprising:

acquiring an information from the second base station by the first base station, wherein the information is indicative for a relative timing displacement between a first time pattern of the first radio resource partitioning scheme and a second time pattern of the second radio resource partitioning scheme, and adapting the first time pattern of the first radio resource partitioning scheme, which is used by the first relay node, to the second time pattern of the second radio resource partitioning scheme, which is used by the second relay node, in such a manner that a radio interference between the first relay node and the second relay node is reduced at least partially.

2. The method as set forth in claim 1, wherein the information comprises a value representing the relative timing displacement.

3. The method as set forth in claim 1, wherein the information represents the adapted first time pattern.

4. The method as set forth in claim 1, wherein
the information represents the length of a time subframe comprising a certain number of time slots, wherein a first subset of the time slots is used for transmitting radio signals between the second relay node and the second base station and
a complementary second subset of the time slots is used for transmitting radio signals between a user equipment being served by the second relay node and the second relay node.

5. The method as set forth in claim 4, wherein the information further represents a ratio between the number of time slots of the first subset and the number of time slots of the second subset, and wherein the relative timing displacement is defined in units of the time subframe.

6. The method as set forth in claim 4, wherein
the relative timing displacement is defined by a modulo operation of a total timing displacement and the time subframe.

7. The method as set forth in claim 1, wherein the relative timing displacement is defined in units of the time subframe.

8. The method as set forth in claim 1, wherein
the information is acquired via an X2-interface between the second base station and the first base station.

9. The method as set forth in claim 1, wherein
the information is acquired via a further network node and/or an Operation and Maintenance Center.

10. The method as set forth in claim 1, further comprising
determining a strength of interference which is caused by transmitting a radio signal from one of the two relay nodes and by receiving the radio signal by the other of the two relay nodes, and
comparing the determined strength of interference with a predefined reference value,
wherein the steps of acquiring and adapting are only carried out if the determined strength of interference is larger than the predefined reference value.

11. The method as set forth in claim 1, wherein the first base station and the second base station represent a Self Organizing Network.

12. The method as set forth in claim 11, wherein during adapting the first time pattern of the first radio resource partitioning scheme the second radio resource partitioning scheme is maintained unchanged.

13. The method as set forth in claim 12, further comprising
transmitting a pre-warning signal from the first base station to the second base station, wherein the pre-warning signal indicates an upcoming adaptation of the first time pattern of the first radio resource partitioning scheme.

14. The method as set forth in the preceding claim 12, wherein
adapting the first time pattern of the first radio resource partitioning scheme comprises a small change towards an optimal adapted first time pattern.

15. The apparatus as set forth in claim 1, wherein
the information is acquired via an X2-interface between the second base station and the first base station.

16. A first base station for coordinating its first radio resource partitioning scheme being used also by a first relay node being served by the first base station with a second radio resource partitioning scheme being used by a second base station and by a second relay node being served by the second base station, the first base station comprising
a unit for acquiring an information from the second base station, wherein the information is indicative for a relative timing displacement between (a) a first time pattern of the first radio resource partitioning scheme and (b) a second time pattern of the second radio resource partitioning scheme, and
a unit for adapting the first time pattern of the first radio resource partitioning scheme, which is used by the first relay node, to the second time pattern of the second radio resource partitioning scheme, which is used by the second relay node, in such a manner that a radio interference between the first relay node and the second relay node is reduced at least partially.

17. An apparatus, comprising
at least one data processor; and
at least one memory memories including computer readable instruction code,
the one or more memories and the computer readable instruction code configured, with the at least one data processor, to cause the apparatus to perform at least the following
coordinating a first radio resource partitioning scheme being used by a first base station and by a first relay node being served by the first base station with a second radio resource partitioning scheme being used by a second base station and by a second relay node being served by the second base station, the coordinating comprising:
acquiring an information from the second base station by the first base station, wherein the information is indicative for a relative timing displacement between a first time pattern of the first radio resource partitioning scheme and a second time pattern of the second radio resource partitioning scheme, and
adapting the first time pattern of the first radio resource partitioning scheme, which is used by the first relay node, to the second time pattern of the second radio resource partitioning scheme, which is used by the second relay node, in such a manner that a radio interference between the first relay node and the second relay node is reduced at least partially.

18. The apparatus as set forth in claim 17, wherein the information comprises a value representing the relative timing displacement.

19. The apparatus as set forth in claim 17, wherein the information represents the adapted first time pattern.

20. The apparatus as set forth in claim 17, wherein
the information represents the length of a time subframe comprising a certain number of time slots, wherein a first subset of the time slots is used for transmitting radio signals between the second relay node and the second base station and a complementary second subset of the time slots is used for transmitting radio signals between a user equipment being served by the second relay node and the second relay node.

21. The apparatus as set forth in claim 17, wherein the relative timing displacement is defined in units of the time subframe.

22. The apparatus as set forth in claim 17, wherein the one or more memories and the computer readable instruction code are further configured, with the at least one data processor, to cause the apparatus to perform at least the following determining a strength of interference which is caused by transmitting a radio signal from one of the two relay nodes and by receiving the radio signal by the other of the two relay nodes, and comparing the determined strength of interference with a predefined reference value, wherein the steps of acquiring and adapting are only carried out if the determined strength of interference is larger than the predefined reference value.

* * * * *